(12) United States Patent
Fuji et al.

(10) Patent No.: US 8,480,801 B2
(45) Date of Patent: Jul. 9, 2013

(54) SOLIDIFICATION METHOD OF CERAMIC POWDER AND SOLIDIFIED CERAMICS

(75) Inventors: Masayoshi Fuji, Nagoya (JP);
Tomohiro Yamakawa, Yokohama (JP);
Minoru Takahashi, Nagoya (JP)

(73) Assignee: National University Corporation Nagoya Institute of Technology, Nagoya (JP)

( * ) Notice: Subject to any disclaimer, the term of this patent is extended or adjusted under 35 U.S.C. 154(b) by 266 days.

(21) Appl. No.: 12/918,890

(22) PCT Filed: Feb. 26, 2009

(86) PCT No.: PCT/JP2009/053526
§ 371 (c)(1),
(2), (4) Date: Nov. 19, 2010

(87) PCT Pub. No.: WO2009/107709
PCT Pub. Date: Sep. 3, 2009

(65) Prior Publication Data
US 2011/0053761 A1    Mar. 3, 2011

(30) Foreign Application Priority Data

Feb. 27, 2008 (JP) .................................. 2008-046128

(51) Int. Cl.
*C04B 12/04* (2006.01)
(52) U.S. Cl.
USPC .............. 106/600; 106/716; 106/718; 241/14
(58) Field of Classification Search
USPC .................. 106/600, 716, 718; 501/145, 146, 501/147; 241/14
See application file for complete search history.

(56) References Cited

U.S. PATENT DOCUMENTS 4,509,985 A * 4/1985 Davidovits et al. ............ 106/624
4,608,795 A * 9/1986 Neuschaeffer et al. ..... 52/309.12
(Continued)

FOREIGN PATENT DOCUMENTS

| JP | A 9-124354 | 5/1997 |
|----|------------|--------|
| JP | A 9-208278 | 8/1997 |
| JP | A 2004-502629 | 1/2004 |
| JP | A 2008-526689 | 7/2008 |

OTHER PUBLICATIONS

Yamakawa et al., "Fabrication of non-firing ceramics utilizing ceramic powder treated by mechanochemical," Proceedings of 20th Autumn Symposium, Ceramic Society of Japan, Sep. 12, 2007, p. 17. (with English-language abstract).

(Continued)

*Primary Examiner* — Paul Marcantoni
(74) *Attorney, Agent, or Firm* — Oliff & Berridge, PLC

(57) ABSTRACT

[Object] Providing a solidified ceramic body with an improved mechanical strength, wherein the solidified ceramic body is fabricated by activating ceramic powder through mechanochemical treatment and solidifying the activated ceramic powder through alkali treatment.
[Method of Solution] Activated ceramic powder having mechanochemically amorphized surfaces is obtained by grinding ceramic powder which is composed of silicic acid and/or silicate at least at surfaces thereof (grinding process). Inorganic fibers and/or plastic fibers are added to the activated ceramic powder and are mixed with the activated ceramic powder (mixing process), and a solidified ceramic body is obtained by adding alkali water solution containing alkaline metal hydroxide and/or alkaline earth metal hydroxide to the powder (alkali treatment process).

13 Claims, 2 Drawing Sheets

U.S. PATENT DOCUMENTS

| | | | | |
|---|---|---|---|---|
| 4,629,507 A | * | 12/1986 | Fukushima | 106/605 |
| 5,584,895 A | * | 12/1996 | Seike et al. | 44/598 |
| 5,601,643 A | * | 2/1997 | Silverstrim et al. | 106/624 |
| 6,221,148 B1 | * | 4/2001 | Mathur et al. | 106/484 |
| 6,296,699 B1 | * | 10/2001 | Jin | 106/814 |
| 6,403,257 B1 | | 6/2002 | Christian et al. | |
| 6,966,945 B1 | * | 11/2005 | Mazany et al. | 106/600 |
| 6,969,422 B2 | * | 11/2005 | Mazany et al. | 106/600 |
| 7,575,630 B2 | * | 8/2009 | Virtanen | 106/718 |
| 7,846,250 B2 | * | 12/2010 | Barlet-Gouedard et al. | 106/600 |
| 8,057,594 B2 | * | 11/2011 | Doyoyo et al. | 106/679 |
| 2001/0013302 A1 | * | 8/2001 | Mathur et al. | 106/484 |
| 2009/0028948 A1 | | 1/2009 | Payne et al. | |

OTHER PUBLICATIONS

International Search Report issued in corresponding International Application No. PCT/JP2009/053526, mailed Apr. 14, 2009. (with English-language translation).

Written Opinion issued in corresponding International Application No. PCT/JP2009/053526, mailed Apr. 14, 2009. (with English-language translation).

International Preliminary Report an Patentability issued in corresponding International Application No. PCT/JP2009/053526, completed Apr. 9, 2010. (with English-language translation).

* cited by examiner

SOLIDIFICATION METHOD OF CERAMIC POWDER AND SOLIDIFIED CERAMICS

TECHNICAL FIELD

The present invention relates to a method for solidifying ceramic powder without using binder such as cement and water glass nor sintering the ceramic powder at a high temperature. The present invention also relates to solidified ceramics.

BACKGROUND ART

Since cement clinker is obtained by mixing limestone with clay and sintering the mixture, each of sintering of the limestone and burning of heavy fuel oil causes release of carbon dioxide gas in obtaining the cement clinker. Therefore, it is said that one ton of carbon dioxide gas is generated in sintering a ton of cement clinker. In recent years, a new alternative technology to replace cement is sought because the global warming has become a worldwide concern and emission constraint of the carbon dioxide gas has become a significant subject.

Under the circumstances, a solidified ceramic body solidified at a normal temperature is getting much attention as energy-saving material which is free from limestone and sintering. This solidified ceramic body is fabricated by binding ceramic powder by means of water glass which serves as binder. In fabricating this solidified ceramic body, the water glass is mixed with filler such as metakaolin, and metal ions in the filler dissolves and reacts with the water glass. Thus, sodium silicate constituting the water glass gets cross-linked to become an inorganic polymer. Then, a dehydration-condensation reaction proceeds along with water evaporation which results in the solidified ceramic body.

Thus, it is possible to easily obtain building material such as blocks at a normal temperature without using limestone if the solidified ceramic body is fabricated by using, as is described above, the water glass to solidify the filler (although it is preferable to sinter the solidified ceramic body at 750 degrees C., this temperature is still far lower than a temperature at which the cement clinker is sintered.) Therefore, the amount of the carbon dioxide gas generated in fabricating this solidified ceramic body is far smaller than that in fabricating the cement.

However, in the above-described solidified ceramic body fabricated by using the water glass as the binder, the solubility of ceramics in the solidified ceramic body significantly changes depending on the proportion of silicon to sodium in the water glass and the degree of polymerization. Therefore, it is hard to control the solidification so as to reproductively make the solidified ceramic body have high strength. In addition, since the water glass is used in large amounts in fabricating the solidified ceramic body, evaporation of water in the water glass tends to cause the solidified ceramic body to deform and crack. This results in a problem that the mechanical strength of the solidified ceramic body is insufficient. Moreover, the evaporation of the water causes a condensation reaction which results in a problem that the dimension accuracy of the solidified ceramic body is insufficient. Moreover, since the water glass is used in large amounts in fabricating the solidified ceramic body, fractions of the water glass become prominent on the surface of the solidified ceramic body, make the solidified ceramic body stained in white, and harm the appearance of the solidified ceramic body. Moreover, since the highly viscous water glass and the ceramic powder have to be mixed well, it takes a large amount of energy and time to mix the water glass and the ceramic powder. Furthermore, in order to cause a chemical reaction between a large amount of the water glass and the ceramics, the ceramics have to have a phase composed of silicic acid or silicate not only at the surfaces thereof but also at inner portions with a certain depth from the surfaces.

As an art for solving these problems of the solidified ceramic body, which is solidified at a normal temperature and is fabricated by binding the ceramic powder by means of the water glass as the binder, non-sintering ceramics have been developed which are fabricated by activating ceramic powder through mechanochemical treatment and solidifying the activated ceramic powder through alkali treatment (see The Ceramic Society of Japan, Proceedings of 20th Autumn Symposium, p. 17.)

This art makes it easy to control the solidification, improves the mechanical strength, the dimension accuracy and the appearance of the solidified ceramic body, decreases energy consumed in fabricating the solidified ceramic body, and widens variety of resources as the raw material for the solidified ceramic body.

SUMMARY OF INVENTION

Technical Problem

However, further improvement of the mechanical strength is desired for the non-sintering ceramics which are fabricated by activating ceramic powder through mechanochemical treatment and solidifying the activated ceramic powder through alkali treatment.

In view of this situation, it is an object of the present invention to provide a solidified ceramic body with an improved mechanical strength, wherein the solidified ceramic body is fabricated by activating ceramic powder through mechanochemical treatment and solidifying the activated ceramic powder through alkali treatment.

Solution to Problem

A solidification method according to the present invention is characterized by including: a grinding process for obtaining activated ceramic powder having mechanochemically amorphized surfaces by grinding ceramic powder which is composed of silicic acid and/or silicate at least at surfaces thereof; a mixing process for obtaining a fiber-activated ceramic powder mixture by adding inorganic fibers and/or plastic fibers to the activated ceramic powder and mixing the inorganic fibers and/or plastic fibers with the activated ceramic powder; and an alkali treatment process for obtaining a solidified ceramic body by adding alkali water solution containing alkali metal hydroxide and/or alkaline earth metal hydroxide to the fiber-activated ceramic powder mixture and thereby dissolving and reprecipitating surfaces of the activated ceramic powder.

The solidification method of the ceramic powder according to the present invention obtains the solidified ceramic body by means of mechanochemical phenomena. In the mechanochemical phenomena, chemical bonding or change in electron density distribution occur in a solid substance under shock stress or shear stress caused by crushing or the like. This sometimes results in various chemical reactions at local areas caused by movements of electrons and sometimes results in excitation of electronic energy which is different from an excited state in thermal processes. The silicic acid and silicate can be amorphized under the mechanochemical treatment. Therefore, in order to utilize the phenomena, powder of the silicic acid and/or silicate is amorphized in the grinding process by grinding the powder by means of a ball mill or the like. In addition, alkali is acted on the amorphized powder so that the alkaline reacts with the noncrystalline phases and that the powder is solidified through dissolution and reprecipitation.

Since the ceramic powder serving as raw material is composed of silicic acid and/or silicate at least at surfaces thereof, the surfaces are mechanochemically amorphized in the grinding process and the ceramic powder becomes the activated ceramic powder which is nonresistant against the alkaline. Then, in the mixing process, the fiber-activated ceramic powder mixture is obtained by adding the inorganic fibers and/or the plastic fibers to the activated ceramic powder and mixing the inorganic fibers and/or the plastic fibers with the activated ceramic powder. Moreover, in the alkali treatment process, the fiber-activated ceramic powder mixture is solidified by causing the alkali to act on the fiber-activated ceramic powder mixture. In the alkali treatment process, the noncrystalline phases at surfaces of the activated ceramic powder are affected by alkali, dissolved, reprecipitated through dehydration-condensation reaction, and solidified with the inorganic fibers and/or plastic fibers included therein. Thus, the solidified ceramic body according to the present invention is fabricated.

In the solidified ceramic body obtained in this way, the inorganic fibers and/or the plastic fibers are included in solidified substances which bind the solidified activated ceramic powder together. Thus, the solidified ceramic body has a property of a fiber-reinforced composite and becomes a solidified body having an improved mechanical strength compared to a solidified body without having inorganic fibers and/or plastic fibers.

In addition, since water glass is not used in fabricating the solidified ceramic body, the shrinkage ratio in the dewatering process is not so large and it is therefore possible to fabricate a compact with an improved dimension accuracy. Moreover, it is possible to suppress deformation and cracks in the compact and therefore possible to improve the mechanical strength. Moreover, since water glass is not used which significantly changes its characteristics depending on the degree of polymerization, it is possible to control the solidification easily and improve quality stability such as the mechanical strength. Moreover, unlike the water glass which is highly viscous and difficult to mix homogeneously with raw material, the alkali water solution containing the alkali metal hydroxide and/or the alkaline earth metal hydroxide has low viscosity, easy to homogeneously mix with the ceramic powder serving as raw material, and requires small energy and short time in being mixed with the ceramic powder. Furthermore, since it is easy to obtain a homogeneous mixture, it is unlikely that segregation of the alkali causes the solidified ceramic body to seem stained in white.

In a dissolution process, the alkali metal hydroxide contained in the alkali water solution may be any of potassium hydroxide, sodium hydroxide, lithium hydroxide and the like. In the dissolution process, the alkaline earth metal hydroxide contained in the alkali water solution may be calcium hydroxide, barium hydroxide and the like.

The inorganic fibers to be mixed with the activated ceramic powder may be any of carbon fibers, alumina fibers, SiC fibers, SiN fibers and the like. Especially, the carbon fibers are light and superior in the mechanical strength and can therefore constitute a solidified ceramic body which is light and superior in the mechanical strength. In addition, inorganic fibers composed of carbon nanotubes can be used as well. Since the carbon nanotubes are notably superior in the mechanical strength and have characteristics of adsorbent, they can constitute a solidified ceramic body as a functional material.

Organic fibers to be mixed with the activated ceramic powder may be any of several kinds of plastic fibers and several kinds of natural fibers. The plastic fibers may be any of fibers made of polyethylene, fibers made of polypropylene, fibers made of polyamide resin and the like. Among them, fibers made of aromatic polyamide resin are suitable because they are superior in the mechanical strength and the thermal resistance. Especially, fibers made of poly-p-phenyleneterephthalamide (Kevlar (a registered trademark owned by E.I. du Pont de Nemours and Company)) are suitable, wherein the poly-p-phenyleneterephthalamide is obtained from p-phenylenediamine and terephthaloyl chloride through co-condensation polymerization. These fibers have a tension strength five times larger than that of steel and are superior in thermal resistance, rub resistance, cutting resistance and shock resistance. Therefore, the solidified ceramic body fabricated by mixing these fibers to the activated ceramic powder is superior in the mechanical strength, the thermal resistance, the rub resistance, the cutting resistance and the shock resistance. The natural fibers may be, for example, cellulose fibers or animal fibers such as wool and silk and the like.

With the solidification method of the ceramic powder according to the present invention, it is possible to obtain the solidified ceramic body according to the present invention. Thus, the solidified ceramic body according to the present invention is characterized by being solidified by treating a fiber-activated ceramic powder mixture with alkali water solution containing alkali metal hydroxide and/or alkaline earth metal hydroxide, wherein the fiber-activated ceramic powder mixture is obtained by adding inorganic fibers and/or plastic fibers to activated ceramic powder, and the activated ceramic powder is obtained by mechanochemically amorphizing ceramic powder which is composed of silicic acid and/or silicate at least at surfaces of the ceramic powder.

DESCRIPTION OF EMBODIMENTS

<Raw Material>

Ceramics serving as raw materials have to be composed of silicic acid and/or silicate at least at their surfaces. Such ceramics can be any of clay mineral, quartz, $SiO_2$—$Al_2O_3$ inorganic powder and the like, wherein the clay mineral may be bentonite, kaolinite, metakaolin, montmorillonite and the like, and the $SiO_2$—$Al_2O_3$ inorganic powder may be mullite and the like. Among them, the clay mineral and the quartz are suitable because they are obtained at a low cost and in large amounts. The inventors have obtained solidified ceramic bodies which are precise and mechanically strong by using the metakaolin as the clay mineral. In addition, waste material such as fly ash, "Kira", glass, paper sludge, aluminum dross and the like can be used as the ceramics. The ceramics which are composed of silicic acid and/or silicate only at the surfaces can be any of, for example, silicon nitride, silicon carbid, aluminosilicate (zeolite), sialon (SiAlON), silicon oxynitride (SiON), silicon oxycarbide (SiOC) and the like.

In addition, aggregate which is composed of silicic acid and/or silicate at the surfaces can be used in combination with them. This aggregate can be any of sand, crushed sand, gravel, crushed stone, silica sand, silica powder, fly ash, mica, diatom earth, mica mineral, rock powder ("Shirasu" (volcanic ash), "Kohgaseki" (rhyolite) and the like), basalt, feldspar, wollastonite, clay, bauxite, sepiolite, fibrous material and the like.

<Grinding Process>

Figure 1:
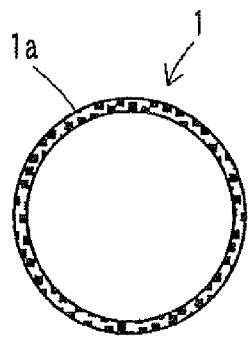
FIG. 1 is a schematic sectional view showing activated ceramic powder.

In the grinding process, ceramic powder which is composed of silicic acid and/or silicate at least at the surfaces thereof is grinded to become, as shown in FIG. 1, activated ceramic powder 1 having noncrystalline layers 1a at which the surfaces of the ceramic powder 1 are amorphized mechanochemically. In the noncrystalline layers 1a, a silica network is in an amorphous state and is therefore vulnerable to alkali.

In making this mechanochemical behavior function, it is effective to apply impulse force, friction force, compressing force, shearing force and the like in a complex manner. A device which can make this mechanochemical behavior function may be, but not limited to, a mixing device such as a ball mill, a vibrating mill, a planetary mill, a medium agitation mill and the like, and a crushing device such as a media ball mill, a roller mill, a mortar and the like. In addition, a jet mill and the like may be used which can mainly apply impulse force, grinding force and the like to a target of grinding. In using the jet mill, compression force, shearing force, and impulse force can be applied to the target of grinding. Therefore, the jet mill can amorphize the silicic acid and/or silicate at the surfaces of the ceramics to produce the activated ceramic powder.

In addition, it is preferable to grind the ceramic powder until temporal change of the particle size distribution disappears in the ceramic powder. When the ceramic powder is grinded to the extent that the temporal change of the particle size disappears, the ceramic powder has presumably come to a boundary state at which the ceramic powder cannot be broken up anymore since the mechanochemical amorphizing of the ceramic surfaces has advanced to its limit. The activated ceramic powder 1 obtained by grinding the ceramic powder until the boundary state can be dissolved easily in the alkali water solution. In addition, the solidified ceramic body resulting from the activated ceramic powder obtained as above becomes precise and mechanically strong.

<Mixing Process>

In the mixing process, a powder mixture is obtained by adding the inorganic fibers and/or the plastic fibers to the activated ceramic powder obtained in the grinding process and mixing the fibers with the activated ceramic powder.

<Alkali Treatment Process>

The alkali water solution containing the alkali metal hydroxide and/or the alkaline earth metal hydroxide is added to the powder mixture, and the powder mixture is treated by the alkali water solution. A device for mixing and kneading the alkali water solution and the powder mixture may be, but not limited to, any conventionally known mixing device or kneading device. For example, the device may be any of a double arm kneader, a pressure kneader, an Eirich mixer, a super mixer, a planetary mixer, a Banbury mixer, a continuous mixer, a continuous kneader and the like. It is preferable to use a de-airing pug mill to remove air bubbles. With this de-airing pug mill, it is possible to prevent air bubbles from remaining in the solidified ceramic body.

Figure 2:
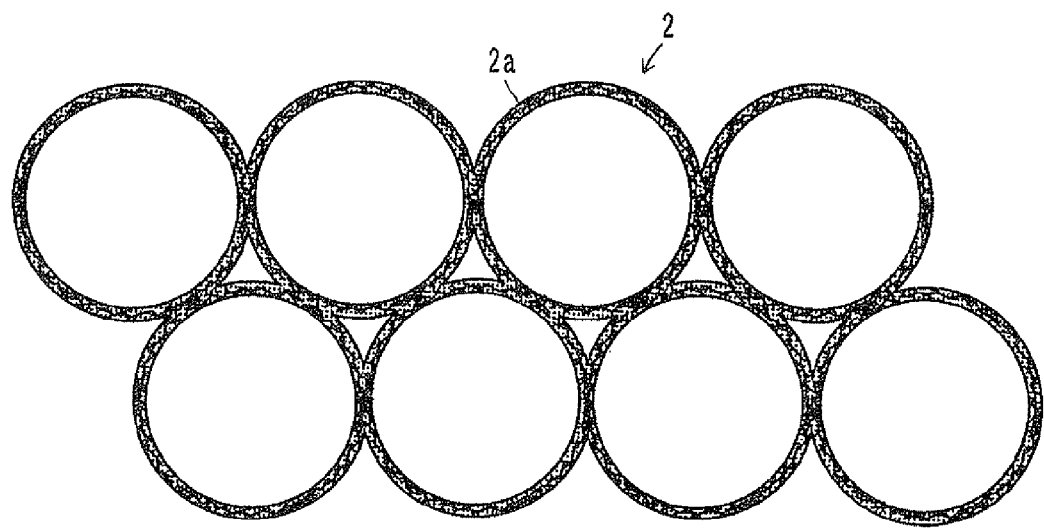
FIG. 2 is a schematic sectional view showing solidified ceramics.
Figure 3:
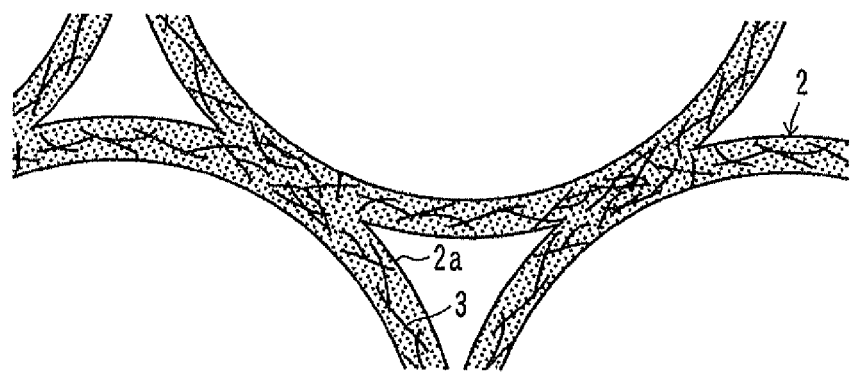
FIG. 3 is a magnified sectional view showing solidified ceramics.
Figure 4:
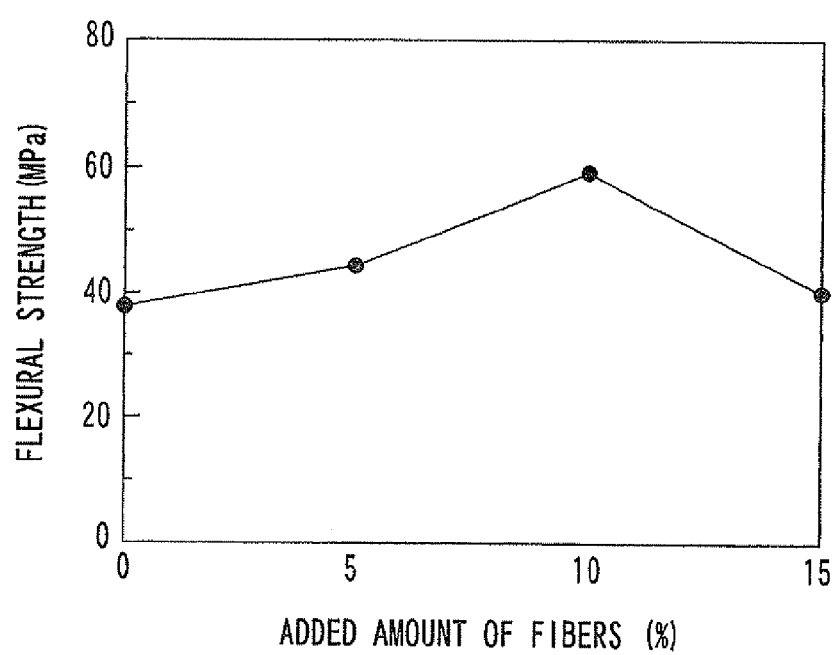
FIG. 4 is a graph showing a relation between an added amount of carbon nanotubes and flexural strength.

In this process, the noncrystalline layers 1a at the surfaces of the activated ceramic powder 1 are dissolved, dehydrated and condensed to form precipitated layers 2a as shown in FIG. 2. At this time, the fibers 3 added in the mixing process are included in the precipitated layers 2a to constitute a complex. Thus, the precipitated layers 2a serve as adhesive in obtaining the solidified ceramic powder 2. In this alkali treatment process, the dissolution reaction and the dehydration-condensation reaction of the noncrystalline layers 1a may be developed at room temperature or accelerated by heating. Although the reaction temperature may be properly selected according to the kind of the ceramics and the kind or the concentration of the alkali water solution, a range from room temperature to 200 degrees C. is normally preferable, and a range from room temperature to 60 degrees C. is more preferable.

EXAMPLES

Hereinafter, detailed description is given of examples of the present invention.

Example 1

In an example 1, metakaolin (having 1 μm of mean particle size) which is obtained by sintering and dehydrating kaolinite is used, and potassium hydroxide water solution is used as the alkali water solution. Then, a carbon nanotube reinforcement solidified metakaolin body is fabricated through each of the following processes.

<Grinding Process>

Activated metakaolin powder is obtained by placing 200 grams of the above-descried metakaolin in a magnetic pot having a volume of 1000 mL, putting zirconia balls (having 10 φ of diameter) into the magnetic pot, and rotating the magnet pot with a ball mill device for 100 hours.

<Mixing Process>

Carbon nanotubes (multi-walled, 10 nmφ, 10 μm of fiber length, 100 of aspect ratio) are added to the activated metakaolin powder to achieve 5 weight percent and mixed with the activated metakaolin powder by using the mixing device.

<Alkali Treatment Process>

50 mass percent of potassium hydroxide solution is added to the mixture obtained in the mixing process to achieve 65 mass percent of the potassium hydroxide solution relative to the raw material. Then, by means of the de-airing pug mill, the resultant material is extruded and cut into a predetermined length to obtain an admixture body having a shape of a square pole. In addition, the admixture body is located in a drier which is set to dry its content at 40 degrees C., and is heated and dried by the drier for 24 hours to obtain the solidified metakaolin body in the example 1.

Example 2

In an example 2, the mixing proportion of the carbon nanotubes is set to 10 weight percent. The other conditions for fabricating the solidified metakaolin body are the same with those in the example 1 and are not described here.

Example 3

In an example 3, the mixing proportion of the carbon nanotubes is set to 15 weight percent. The other conditions for fabricating the solidified metakaolin body are the same with those in the example 1 and are not described here.

Comparative Example 1

In a comparative example 1, the alkali treatment process is performed without adding the carbon nanotubes to the activated metakaolin powder. The other conditions for fabricating the solidified metakaolin body are the same with those in the example 1 and are not described here.

<Evaluation>

Three-point bending strengths have been measured by using a force testing device for the above examples 1 to 3 and the comparative example 1 at room temperature according to JIS R 1601. In the result, the three-point bending strength is 38 MPa for the solidified metakaolin body in the comparative example 1 to which the carbon nanotubes are not added. In contrast, the three-point bending strengths are 43 MPa, 60 MPa and 40 MPa for the solidified metakaolin body in the examples 1, 2 and 3, respectively. Thus, the bending strength of the solidified metakaolin body is improved in the examples 1 to 3 compared to that in the comparative example 1.

Although the multi-walled carbon nanotubes are mixed with the activated metakaolin powder in the examples 1 to 3, single-walled carbon nanotubes and/or carbon fibers may be used in place of the multi-walled carbon nanotubes.

Example 4

In an example 4, metakaolin (having 1 μm of mean particle size) which is obtained by sintering and dehydrating kaolinite is used, and potassium hydroxide water solution is used as the alkali water solution. Then, an aramid fibers reinforcement solidified metakaolin body is fabricated through each of the following processes.

<Grinding Process>

Activated metakaolin powder is obtained by placing 200 grams of the above-descried metakaolin in a magnetic pot having a volume of 1000 ml, putting zirconia balls (having 10 φ of diameter) into the magnetic pot, and rotating the magnet pot with a ball mill device for 100 hours.

<Mixing Process>

Poly-p-phenyleneterephthalamide (Kevlar (a registered trademark owned by E.I. du Pont de Nemours and Company) 29) is added to the activated metakaolin powder to achieve 5 weight percent and mixed with the activated metakaolin powder by using the mixing device.

<Alkali Treatment Process>

50 mass percent of potassium hydroxide solution is added to the mixture obtained in the mixing process to achieve 65 mass percent of the potassium hydroxide solution relative to the raw material. Then, by means of the de-airing pug mill, the resultant material is extruded and cut into a predetermined length to obtain an admixture body having a shape of a square pole. In addition, the admixture body is located in a drier which is set to dry its content at 40 degrees C., and is heated and dried by the drier for 24 hours to obtain the aramid fibers reinforcement solidified metakaolin body in the example 4.

The three-point bending strength has been measured at room temperature according to JIS R 1601 by using a force testing device for the aramid fibers reinforcement solidified metakaolin body obtained in the above-described manner. In the result, the three-point bending strength of the aramid fibers reinforcement solidified metakaolin body is higher than that of the solidified metakaolin body in the comparative example 1 to which the poly-p-phenyleneterephthalamide is not added.

The invention is not limited to the above description of the examples of the present invention. The invention includes various modified embodiments as long as they do not go out of the claimed range and they can be come up with by a person who is skilled in this art.

INDUSTRIAL APPLICABILITY)

The present invention is applicable to many industrial fields as structural material which is energy-saving and emits a small amount of carbon dioxide gas in its fabrication process.

The invention claimed is:

1. A solidification method of ceramic powder, comprising:
grinding ceramic powder which is composed of silicic acid and/or silicate at least at surfaces thereof to obtain activated ceramic powder having mechanochemically amorphized surfaces;
adding inorganic fibers and/or organic fibers to the activated ceramic powder and mixing the inorganic fibers and/or organic fibers with the activated ceramic powder to obtain a fiber-activated ceramic powder mixture; and
adding alkali water solution containing alkali metal hydroxide and/or alkaline earth metal hydroxide to the fiber-activated ceramic powder mixture and thereby dissolving and reprecipitating surfaces of the activated ceramic powder to obtain a solidified ceramic body.

2. The solidification method according to claim 1, wherein the ceramic powder serving as raw material is composed of clay mineral and/or quartz.

3. The solidification method according to claim 2, wherein the clay mineral is metakaolin.

4. The solidification method according to claim 1, wherein the organic fibers are made of aromatic polyamide resin.

5. A solidified ceramic body, the body being solidified by treating a fiber-activated ceramic powder mixture with alkali water solution containing alkali metal hydroxide and/or alkaline earth metal hydroxide,
wherein
the fiber-activated ceramic powder mixture is obtained by adding inorganic fibers and/or organic fibers to activated ceramic powder, and
the activated ceramic powder is obtained by mechanochemically amorphizing ceramic powder which is composed of silicic acid and/or silicate at least at surfaces of the ceramic powder.

6. The solidified ceramic body according to claim 5, wherein
the activated ceramic powder has noncrystalline layers which are obtained by amorphizing the surfaces of ceramic powder through mechanochemical phenomena,
the ceramic powder is solidified by means of precipitated layers which are obtained by dehydrating and condensing the noncrystalline layers dissolved in the alkali water solution, and
the inorganic fibers and/or organic fibers are included in the precipitated layers to constitute a complex.

7. The solidification method according to claim 2, wherein the organic fibers are made of aromatic polyamide resin.

8. The solidification method according to claim 3, wherein the organic fibers are made of aromatic polyamide resin.

9. A solidification method of ceramic powder, comprising:
grinding ceramic powder which is composed of silicic acid and/or silicate at least at surfaces thereof to cause mechanochemical phenomena to obtain activated ceramic powder having mechanochemically amorphized surfaces;
adding inorganic fibers and/or organic fibers to the activated ceramic powder and mixing the inorganic fibers and/or organic fibers with the activated ceramic powder to obtain a fiber-activated ceramic powder mixture; and
adding an alkali water solution containing alkali metal hydroxide and/or alkaline earth metal hydroxide to the fiber-activated ceramic powder mixture, thereby dissolving and reprecipitating surfaces of the activated ceramic powder, thereby forming precipitated layers including the inorganic fibers and/or organic fibers, solidifying the ceramic powder by means of the precipitated layers, and thereby obtaining a solidified ceramic body.

10. The solidification method according to claim 9, wherein the ceramic powder is solidified only by means of the precipitated layers.

11. The solidification method according to claim 9, wherein the ceramic powder serving as raw material is composed of clay mineral and/or quartz.

12. The solidification method according to claim 11, wherein the clay mineral is metakaolin.

13. The solidification method according to claim 9, wherein the organic fibers are made of aromatic polyamide resin.

* * * * *